(12) United States Patent (10) Patent No.: US 9,413,097 B2
Tamarkin et al. (45) Date of Patent: Aug. 9, 2016

(54) HIGH DENSITY CABLED MIDPLANES AND BACKPLANES

(71) Applicant: Intel Corporation, Santa Clara, CA (US)

(72) Inventors: Vladimir Tamarkin, Huntingdon Valley, PA (US); Wayne Genetti, Sanatoga, PA (US); Keith Mease, Gibbstown, NJ (US); Mark Wessel, Aston, PA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/578,707

(22) Filed: Dec. 22, 2014

(65) Prior Publication Data

US 2016/0181719 A1 Jun. 23, 2016

(51) Int. Cl.
*H01R 13/502* (2006.01)
*H01R 43/20* (2006.01)

(52) U.S. Cl.
CPC .............. *H01R 13/502* (2013.01); *H01R 43/20* (2013.01)

(58) Field of Classification Search
USPC ........ 439/638, 532, 502, 527; 174/254, 75 R, 174/251, 36
See application file for complete search history.

(56) References Cited

U.S. PATENT DOCUMENTS

| 8,338,713 | B2 * | 12/2012 | Fjelstad et al. | 174/251 |
|---|---|---|---|---|
| 8,456,859 | B2 * | 6/2013 | Dahlfort et al. | 361/796 |
| 8,948,166 | B2 * | 2/2015 | Leigh | 370/386 |
| 9,054,467 | B2 * | 6/2015 | Hamner et al. | |
| 9,113,568 | B2 * | 8/2015 | Rossman | |
| 2004/0018779 | A1 * | 1/2004 | Kidman | 439/709 |
| 2005/0208836 | A1 * | 9/2005 | Chao et al. | 439/638 |
| 2006/0116023 | A1 * | 6/2006 | Spitaels et al. | 439/532 |
| 2008/0233806 | A1 * | 9/2008 | Rothermel et al. | 439/676 |
| 2010/0266117 | A1 * | 10/2010 | Enge et al. | 379/397 |
| 2012/0122335 | A1 * | 5/2012 | Costello | 439/502 |
| 2013/0084735 | A1 | 4/2013 | Costello | |
| 2013/0130516 | A1 * | 5/2013 | Shifris et al. | 439/65 |
| 2013/0269996 | A1 * | 10/2013 | Lin et al. | 174/266 |
| 2013/0341072 | A1 * | 12/2013 | Lin et al. | 174/254 |
| 2014/0014409 | A1 * | 1/2014 | Lin et al. | 174/75 R |
| 2014/0045368 | A1 * | 2/2014 | Gambardella et al. | 439/502 |
| 2014/0179165 | A1 * | 6/2014 | Afra | 439/620.21 |
| 2014/0360753 | A1 | 12/2014 | Sechrist et al. | |

(Continued)

OTHER PUBLICATIONS

European Application Serial No. 15195492.2, Extended European Search Report mailed Apr. 21, 2016, 6 pgs.

*Primary Examiner* — Alexander Gilman
(74) *Attorney, Agent, or Firm* — Schwegman Lundberg & Woessner, P.A.

(57) ABSTRACT

A cabled midplane includes a first support plate along a plane between a first connector set and a second connector set that connect to line cards on either side of the cabled midplane. The first connector set and the second connector set include connector slices. A wiring sub-layer includes cable slices to provide a connection between the first connector slice of a connector of the first connector set to the first connector slice of a connector of the second connector set, such that the first wiring sub-layer connects each connector of the first connector set, through one cable slice, to a connector of the second connector set. Additional wiring sub-layers are added, and a second support plate, parallel to the first support plate, is provided to encase and support the wiring sub-layers between the first support plate and the second support plate. Other apparatuses and methods are described.

7 Claims, 13 Drawing Sheets

(56) References Cited

U.S. PATENT DOCUMENTS

| | | | |
|---|---|---|---|
| 2015/0027751 A1* | 1/2015 | Su et al. | 174/251 |
| 2015/0111421 A1* | 4/2015 | Rossman | 439/527 |
| 2015/0271938 A1 | 9/2015 | Sechrist | |

* cited by examiner

HIGH DENSITY CABLED MIDPLANES AND BACKPLANES

TECHNICAL FIELD

Embodiments described generally herein relate to backplanes and midplanes. Some embodiments relate to cabled backplanes and midplanes.

BACKGROUND

Many high speed network switches require high connector density on a backplane or a midplane. Printed circuit board (non-cabled) backplanes and midplanes may implement extensive interconnect lengths and can experience high levels of signal loss. Cabled midplane and backplane technologies may require large amounts of space and mechanical support to achieve the large number of connections required for high speed networking applications.

DETAILED DESCRIPTION

A medium-to-large network switch typically includes multiple switch chips, all interconnected to form a specific network topology. Such a network switch is often referred to as a Direct Class Network Switch (DCNS). High speed network switches today include ever-increasing numbers of network ports. Additionally, these high speed network switches have been called upon to provide ever-increasing signaling rates. In order to deal with these two trends, system architects continue to package an increasingly large number of high speed ports within a single DCNS chassis, leading to a significant increase in packaging density and interconnect length. Printed circuit board (PCB) midplane and backplane technologies can no longer achieve the high connector densities used to interconnect switch chips internal to a DCNS. Additionally, PCB midplanes and backplanes exhibit increased signal losses at higher signaling rates, and therefore can no longer support increased interconnect lengths between network switch chips internal to the DCNS. Cabled backplane and midplane technologies can support significantly increased connector densities, and can minimize insertion loss of high speed channels and thus support longer channel lengths used with larger DCNS chassis sizes. However, it is difficult and costly to manage the thousands of cables required to construct large cabled backplanes and midplanes.

Embodiments described herein provide methods for fabrication of high density cabled backplanes and midplanes. Methods in accordance with some embodiments provide for fabricating cabled backplanes and mid planes by sequentially adding wiring sub-layers and layers, power distribution layers, and mechanical support layers. By using this layered approach, embodiments enable a very high connector density. Furthermore, some embodiments provide a cable swizzle (e.g., a "many to many" interconnect) methodology, on a layer basis, in a repeatable and therefore manufacturable process.

Available cabled backplanes are constructed using bundles of conductors, added sequentially. This method works well when mechanical support infrastructure is substantial (which limits the effective connector density) and when the bundles are essentially point-to-point. However, manufacturing of such a backplane is costly and difficult when the space for mechanical infrastructure must be minimized to achieve high effective connector density, or when a full swizzle (e.g., all-to-all interconnect pattern) is needed.

Figure 1:
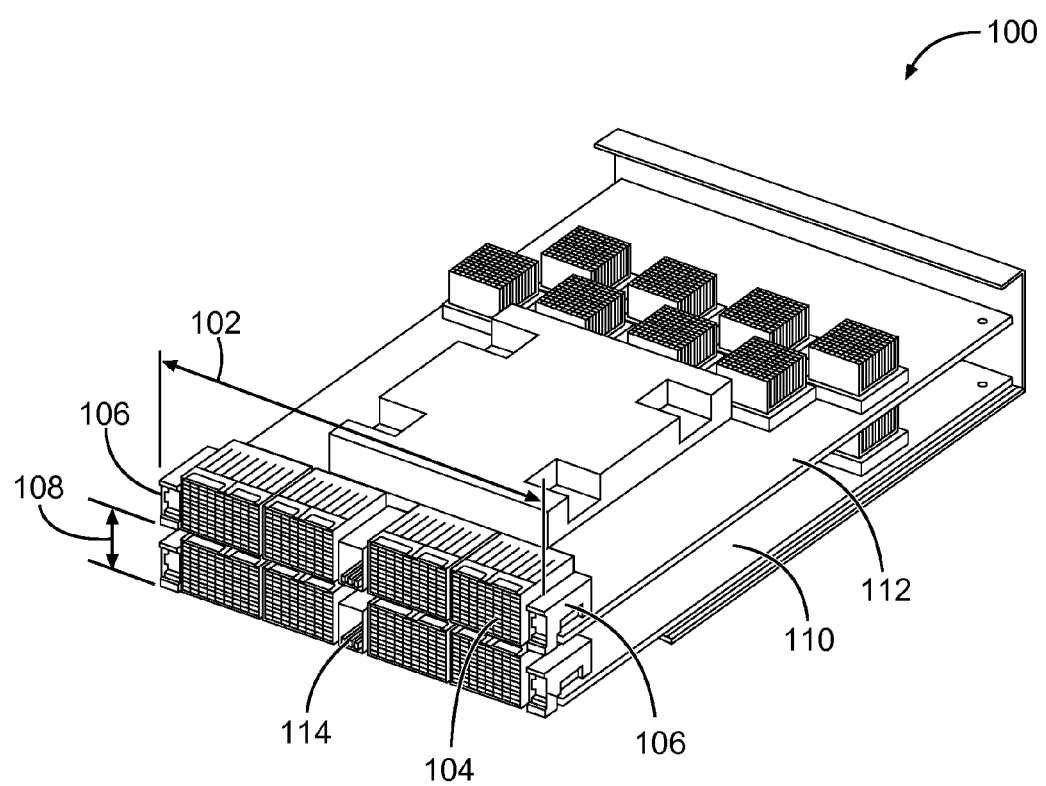
FIG. 1 is a perspective view of a midplane connector envelope for purposes of describing example embodiments.

FIGS. 1-4 are provided to illustrate some of the challenges addressed with various embodiments. FIG. 1 is a perspective view of a line card module showing the midplane/backplane connector envelope 100. The backplane connector envelope 100 has a card width 102 that maximizes connector packaging density by reducing spacing between the connectors 104 (of which four are shown per line card in FIG. 1) and the guide modules 106 (of which two are shown per line card in FIG. 1). A minimum vertical pitch 108 between adjacent line cards 110, 112 leaves little space for mechanical support infrastructure. A power module 114 supplies power to the line cards 110, 112.

Figure 2:
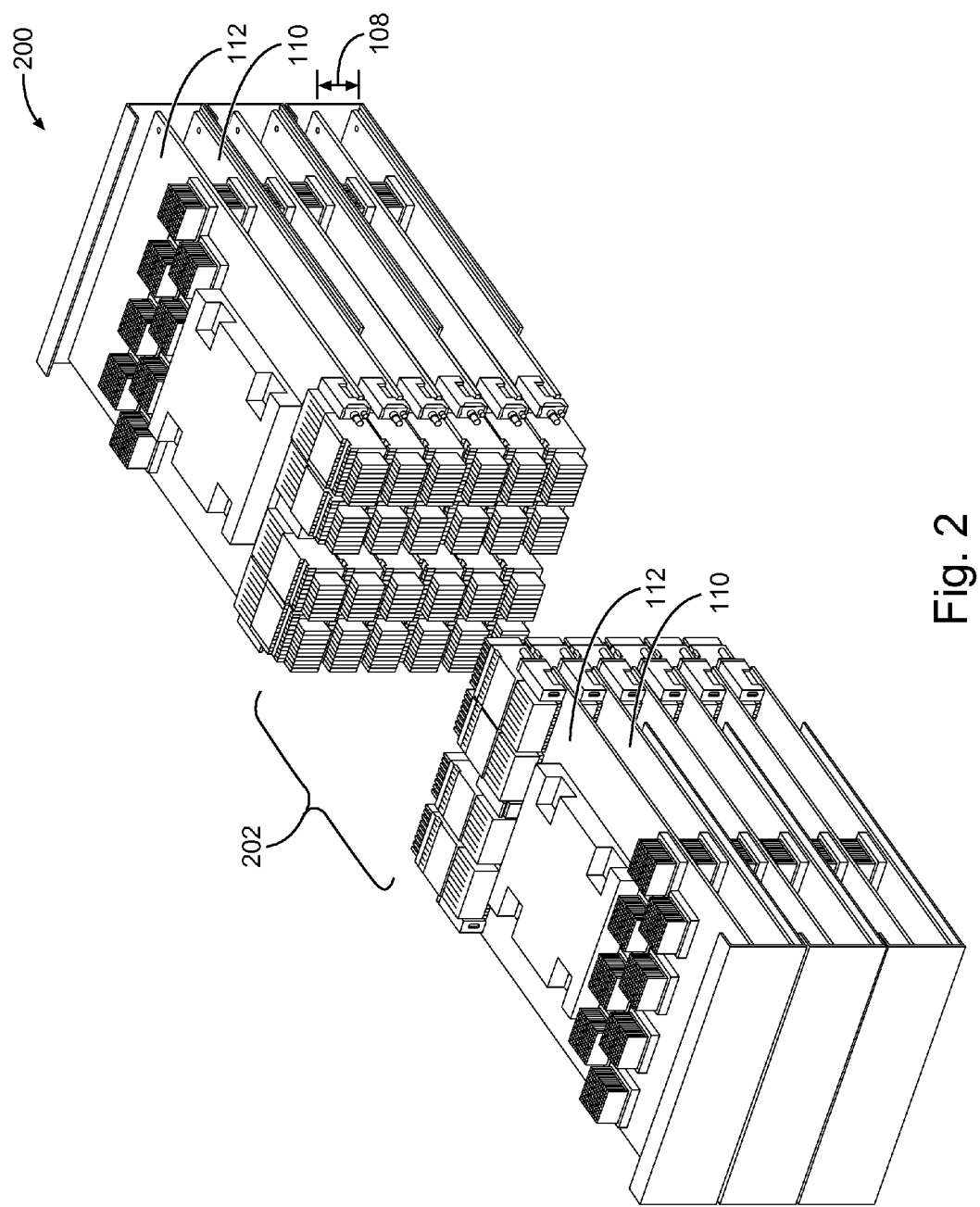
FIG. 2 is a perspective view of a Director Class Network Switch (DCNS) illustrating tight line card pitch for purposes of describing example embodiments.

FIG. 2 is a perspective view of a DCNS illustrating tight card pitch. Midplane connections (not shown in FIG. 2) will connect through a midplane interconnect 202. The number of line cards 204 in a very high port count DCNS 200 exhibits a tight card pitch, which allows little room for mechanical support.

Figure 3:
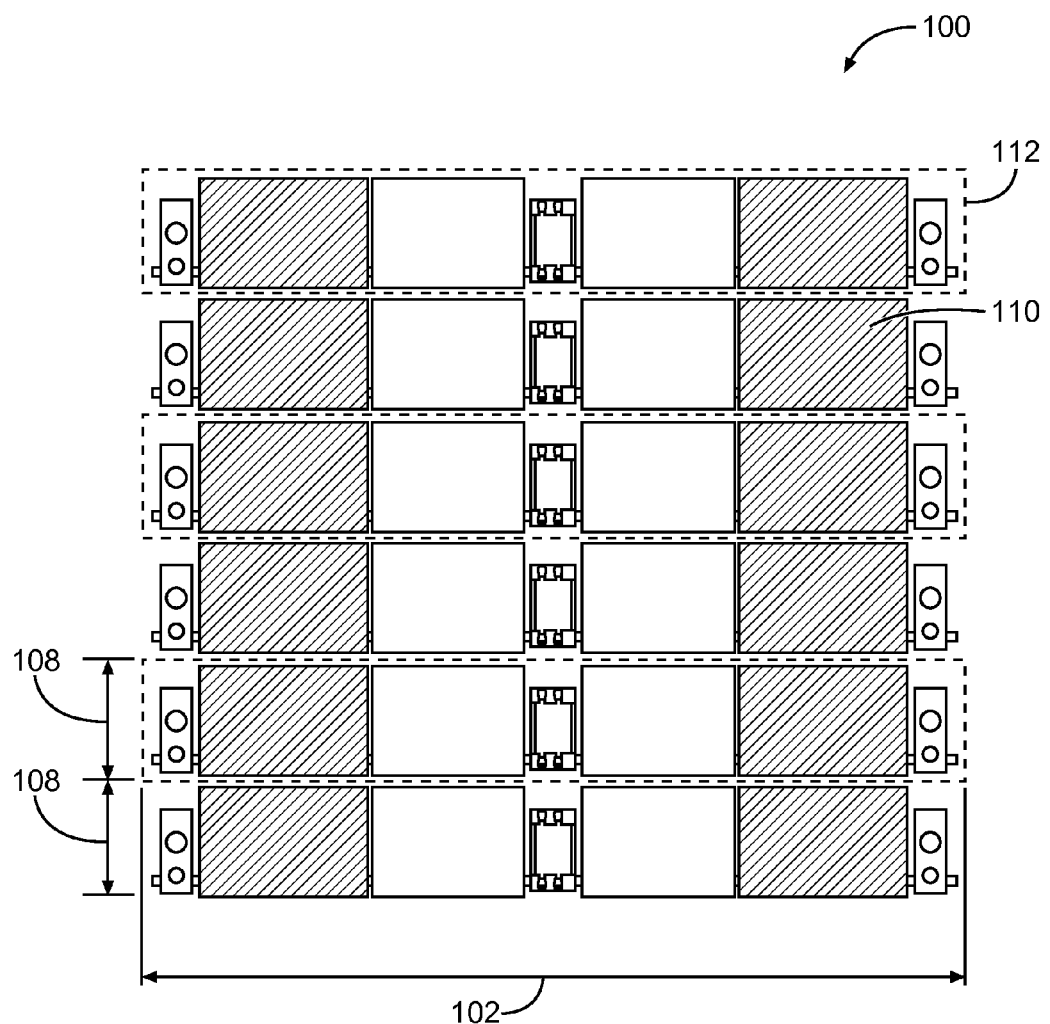
FIG. 3 is a front view of the backplane connector envelope for purposes of describing example embodiments.

FIG. 3 is a front view of the backplane connector envelope 100 shown in FIG. 1 showing additional line cards. FIG. 3 serves to further illustrate the minimal card width 102 and vertical pitch 108 that permits minimal space between line cards 110, 112 for mechanical support.

Figure 4:
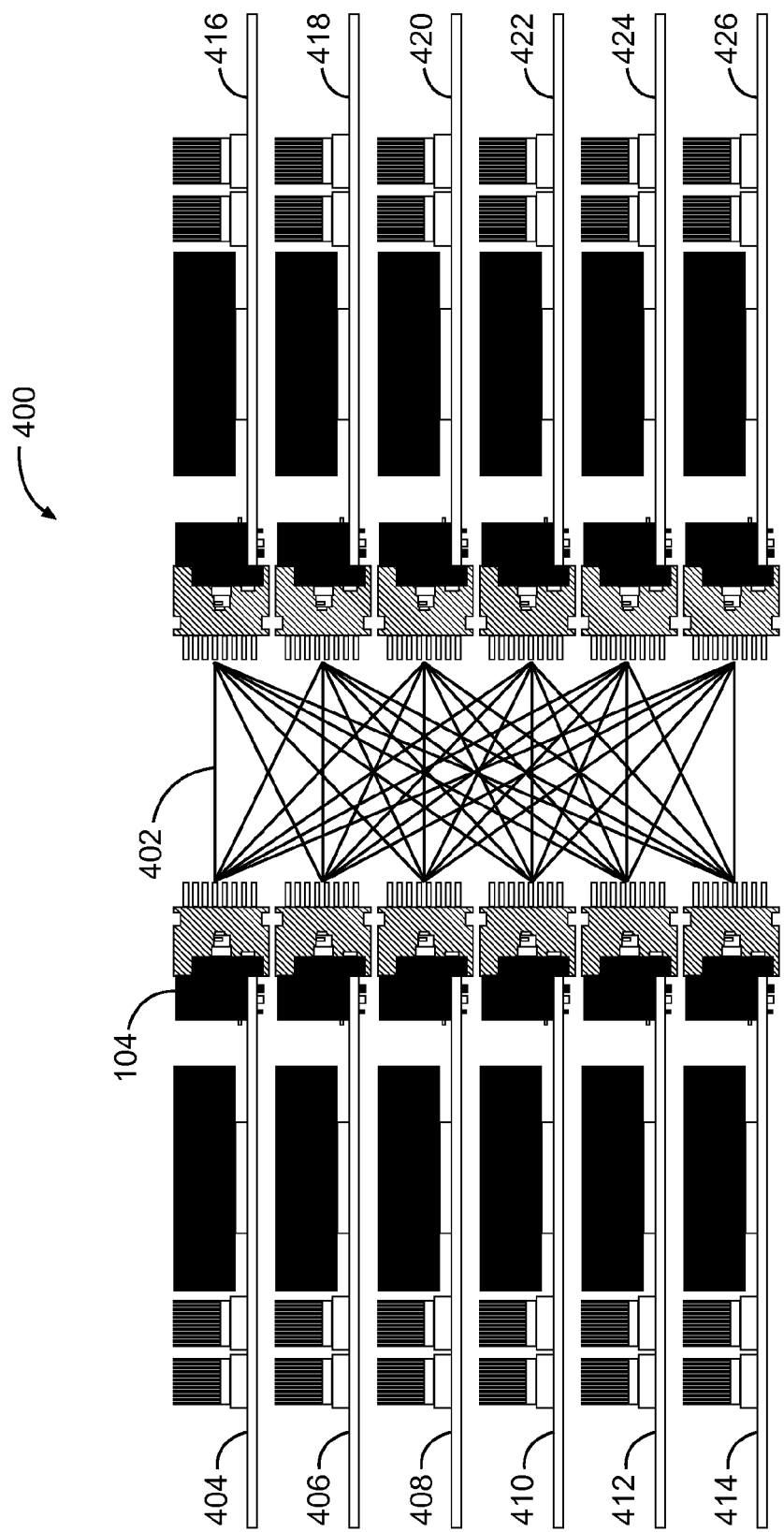
FIG. 4 illustrates an interconnect topology when all connectors on one side of the midplane are connected to all connectors on the other side of the midplane in accordance with some embodiments.

FIG. 4 illustrates an interconnect topology when all connectors on one side of the midplane 400 are connected to all connectors on the other side of the midplane 400 in accordance with some embodiments. However, embodiments are not limited to the interconnect topology shown in FIG. 4, but rather embodiments can include a variety of interconnect topologies, including a complete all-to-all topology. It may be difficult or costly to manufacture an all-to-all interconnected cabled backplane or midplane 400 in a repeatable, reliable fashion because of the relatively high number of conductors 402 included in such a backplane or midplane 400 and/or the high level of conductor cross-over required to achieve an all-to-all type interconnect. In some embodiments, conductors can include copper wires, optical fibers, twisted shielded wires, coaxial cables, etc., although embodiments are not limited to any particular type of conductor. In the one-to-one connection illustrated in FIG. 4, each line card 404, 406, 408, 410, 412, and 414 on one side of the midplane 400 has a connection to every line card 416, 418, 420, 422, 424, and 426 on the other side of the midplane 400.

Embodiments provide a repeatable, reliable method for manufacturing a high density (e.g., "all-to-all" or "many-to-many") interconnected midplane or backplane such as those illustrated in the various views of FIGS. 1-4.

Figure 5:
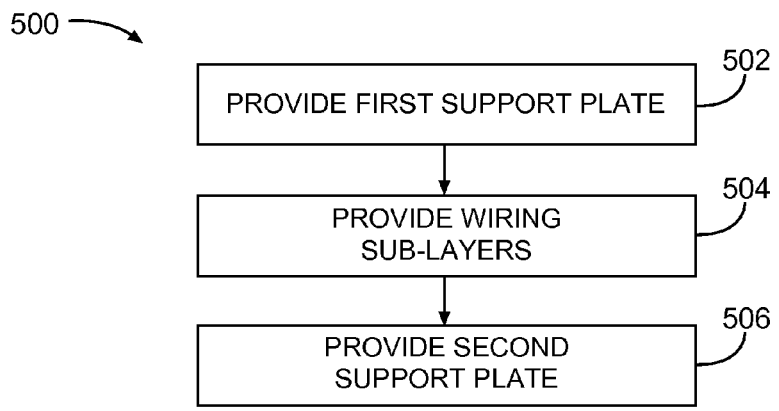
FIG. 5 is a flow chart showing a method for manufacturing a midplane in accordance with some embodiments described herein.

FIG. 5 is a flow chart showing a method 500 for manufacturing a midplane in accordance with some embodiments described herein. Embodiments can also relate to manufacturing a backplane. The midplane or backplane made by method 500 may include a midplane or backplane such as could be used with the assemblies illustrated in FIGS. 1-4. The method 500 is described with reference to some elements illustrated in FIGS. 6 and 7.

Figure 6:
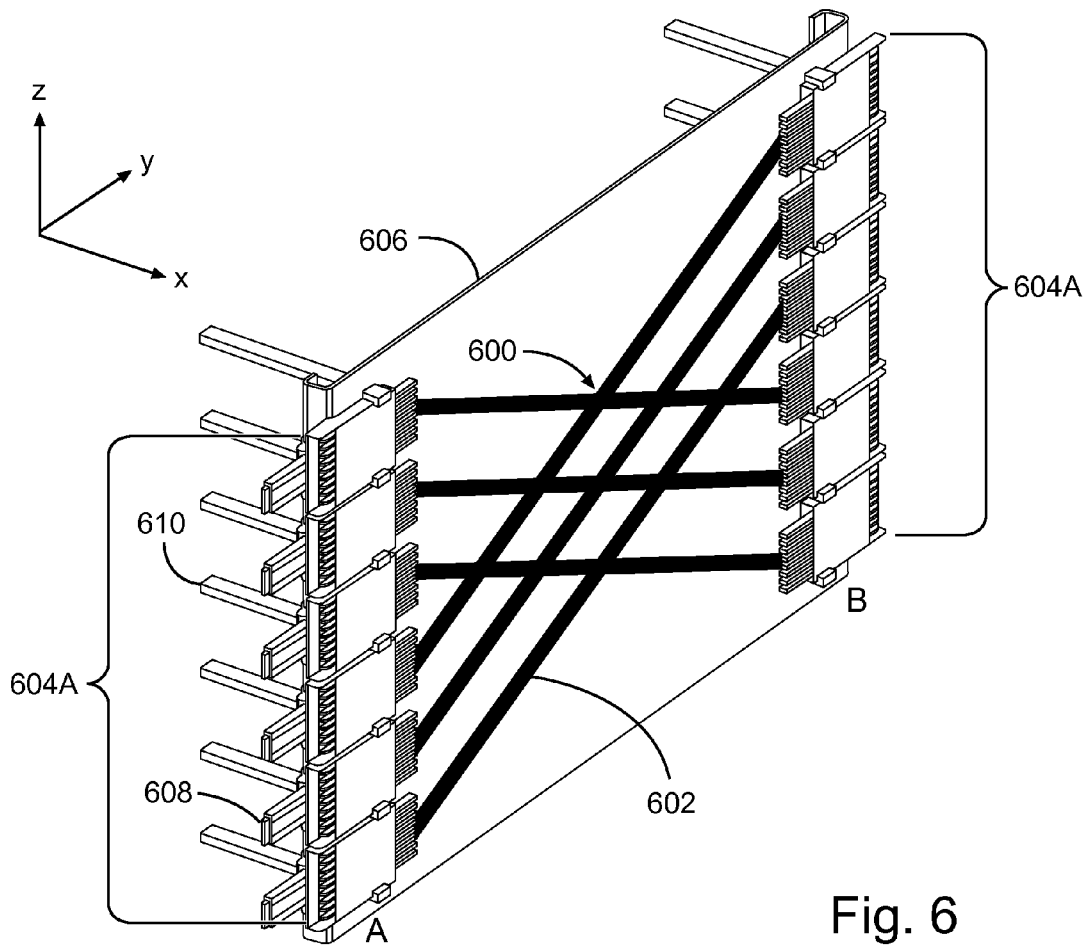
FIG. 6 illustrates a wiring sub-layer in accordance with some embodiments described herein.

FIG. 6 illustrates a wiring sub-layer 600 in accordance with some embodiments described herein. Individual conductors (not shown in FIG. 6) are terminated on both ends A and B with electrical contacts (not shown in FIG. 6) and assembled into cable slices 602. The individual conductors may couple through, for example, male/female coupling or any other coupling, with the connector slice 604A. The cable slices 602 are point-to-point. The cable slices 602 are grouped into a wiring sub-layer 600. The wiring sub-layer 600 includes a full set of cable slices 602 to connect to each line card 404, 406, 408, 410, 412, 414, 416, 418, 420, 422, 424 and 426 (FIG. 4) locations. Cable slices 602 cross over each other in such a way that there is at most a single crossover between any two conductors within the cable slices 602. Furthermore, there is at most a single crossover between any two conductors at any point. This reduces or minimizes bulk conductor buildup to achieve higher wiring/connector density. Furthermore, 402 (FIG. 4) is comprised of a plurality of sub-layers 600.

The illustrated wiring sub-layer 600 is mounted on a support plate 606. The support plate 606 can include one or more guide pins 608 for line card guidance and alignment during line card insertion. The guide pins 608 can displace the support plate 606 from the wiring sub-layer 600 by a distance along an axis (e.g., the x-axis). The support plate 606 can also include a series of holes (not shown in FIG. 6) in which support rods 610 can be added. Support rods 610 are described in more detail below with reference to FIG. 8.

Figure 7:
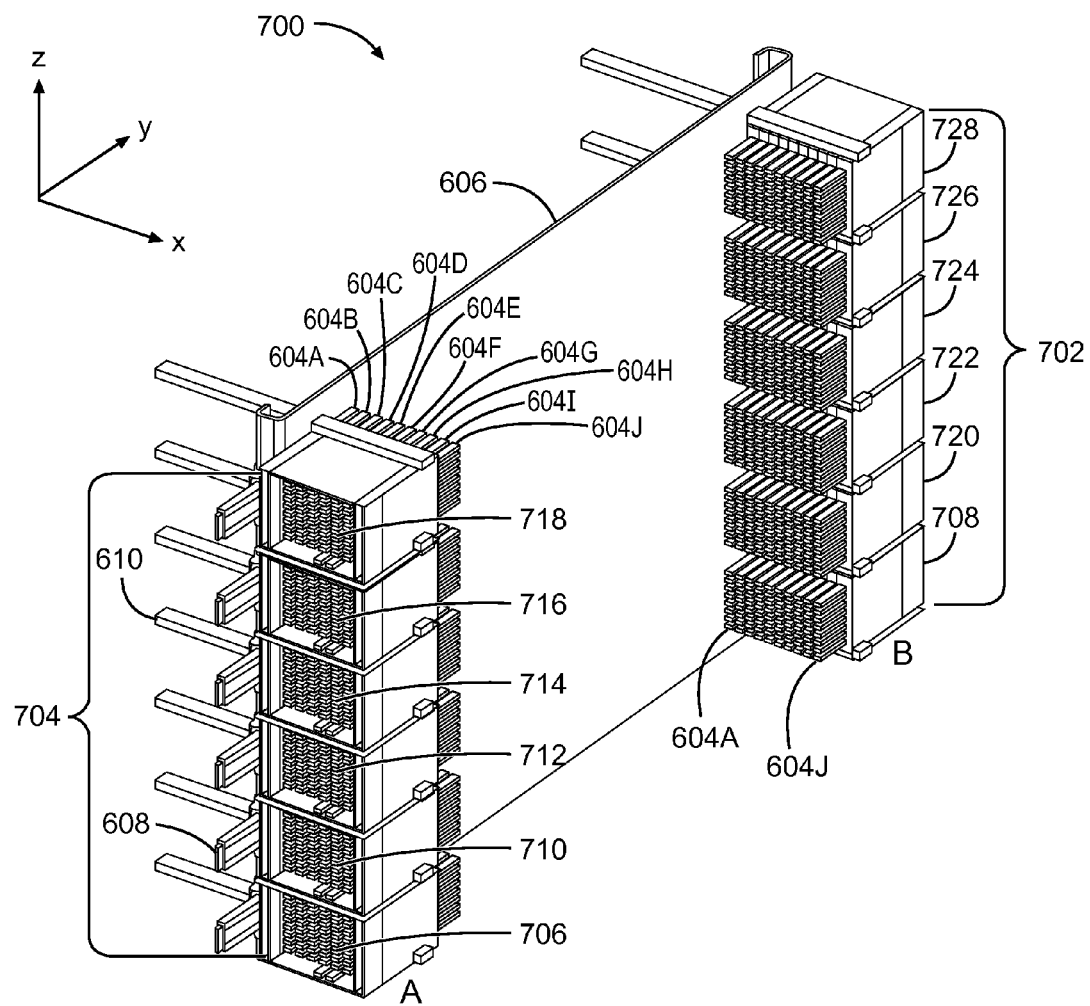
FIG. 7 illustrates a connector-wide wiring layer in accordance with some embodiments described herein.

FIG. 7 illustrates a connector-wide wiring layer 700 in accordance with some embodiments described herein. FIG. 7 further serves to illustrate multiple connector slices 604A-604J of connector sets 702, 704 that are collected in connector shrouds. Additional wiring sub-layers (not shown in FIG. 7) similar to the wiring sub-layer 600 shown in FIG. 6, can be added sequentially in accordance with various embodiments until a wiring layer with a width equal to a connector width is constructed. Connector set 702, 704 width (e.g., shroud width or organizer width), and therefore the number of connector slices 604 in a wiring layer 700, will vary based on manufacturer preferences. In some embodiments, connector shrouds include 4, 6, or 8 connector slices 604, and therefore up to 4, 6, or 8 wiring sub-layers 600, respectively, could be added to create a wiring layer 700 with a width of 4, 6, or 8. However, in some embodiments the number of connector slices 604 can be 16 or 20 slices, or more.

Referring to FIG. 5, the method 500 begins at operation 502 with providing a support plate 606 along a plane (e.g., the y-plane) between two connector sets 702 and 704. One connector set 702 includes a plurality of connectors 708, 720, 722, 724, 726, 728 to connect to respective line cards on a first side B of the cabled midplane. The other connector set 704 includes a plurality of connectors 706, 710, 712, 714, 716, 718 to connect to respective line cards on a second side A of the cabled midplane.

Connectors of the two connector sets 702 and 704 include connector slices 604A-604J. The connector slices in each connector set 702 and 704 include at least a first connector slice 604A that is a nearest distance along an axis (e.g., the x-axis) from the support plate 606 and a second connector slice 604J that is further than the first connector slice 604A along the axis from the support plate 606.

In FIG. 5, the method 500 continues at operation 504 with providing wiring sub-layers 600. Operation 504 includes providing a first wiring sub-layer 600 by mounting a first plurality of cable slices 602 on the support plate 606. Cable slices 602 can be mounted such that individual conductors within each cable slice 602 crosses over other conductors at no more than one point in the plane between the connector sets 702 and 704. Further, cable slices 602 can be mounted such that any point in the plane between connector sets 702, 704 includes no more than one instance of a conductor crossover.

Each cable slice 602 in this wiring sub-layer 600 provides a connection between the first connector slice (e.g., the connector slice 604A closest to the support plate 606) of a connector 706 of one connector set 704 to the first connector slice of a connector 708 of the second connector set 702, such that the first wiring sub-layer connects each connector 706, 710, 712, 714, 716 and 718 of one connector set 704, through one cable slice 602, to a connector 708, 720, 722, 724, 726, and 728 of the other connector set 702. For example, referring to FIG. 7, connector 706 can be connected by a cable slice 602 of the first sublayer to connector 724 of the second connector set 702. At the same time, using different cable slices 602, connector 710 can be connected to connector 726, connector 712 can be connected to connector 728, connector 714 can be connected to connector 708, connector 716 can be connected to connector 720, and connector 718 can be connected to connector 722.

In FIG. 5, operation 504 further includes providing at least a second wiring sub-layer 600 by connecting a second plurality of cable slices 602. Each cable slice 602 in the second wiring sub-layer 600 provides a connection between a second connector slice (e.g., a connector slice spaced a further distance than the first connector slice from the support plate 606) of a connector of one connector set 704 to a second connector slice of a connector of the other connector set 702. As with the first wiring sub-layer 600, the second wiring sub-layer 600 connects each connector of one connector set 704, through one cable slice 602, to a connector of the other connector set 702. The cable slices 602 of the second wiring sub-layer 600 can be connected such that a connector of one connector set 704 is connected to a different connector of the other connector set 702 in the second wiring sub-layer 600 than it was connected to in the first wiring sub-layer 600. For example, as connector 706 was connected to connector 728 in the first wiring sub-layer 600, connector 706 may not be connected to connector 728 in the second wiring sub-layer 600.

In accordance with embodiments, wiring sub-layers 600 are added sequentially until a connector-wide layer is constructed. The method 500 can further include testing electrical connectivity within a wiring sub-layer 600 prior to providing subsequent wiring sub-layers 600. Additionally, the method 500 can include testing each individual cable slice 602. Wiring sub-layers 600 can be added to the width of connector sets 702 and 704 to connect some or all of connector slices 604A-J.

Connector sets 702 and 704 can each be encased in a connector shroud or organizer. Connector width (e.g., shroud width) and therefore the number of slices 604 the connector set 702, 704 contains, depends on connector set 702, 704 manufacturer preferences. Typically, shrouds are made to contain 4, 6 or 8 slices, but can be as large as 16 or 20 slices, or more.

Figure 8:
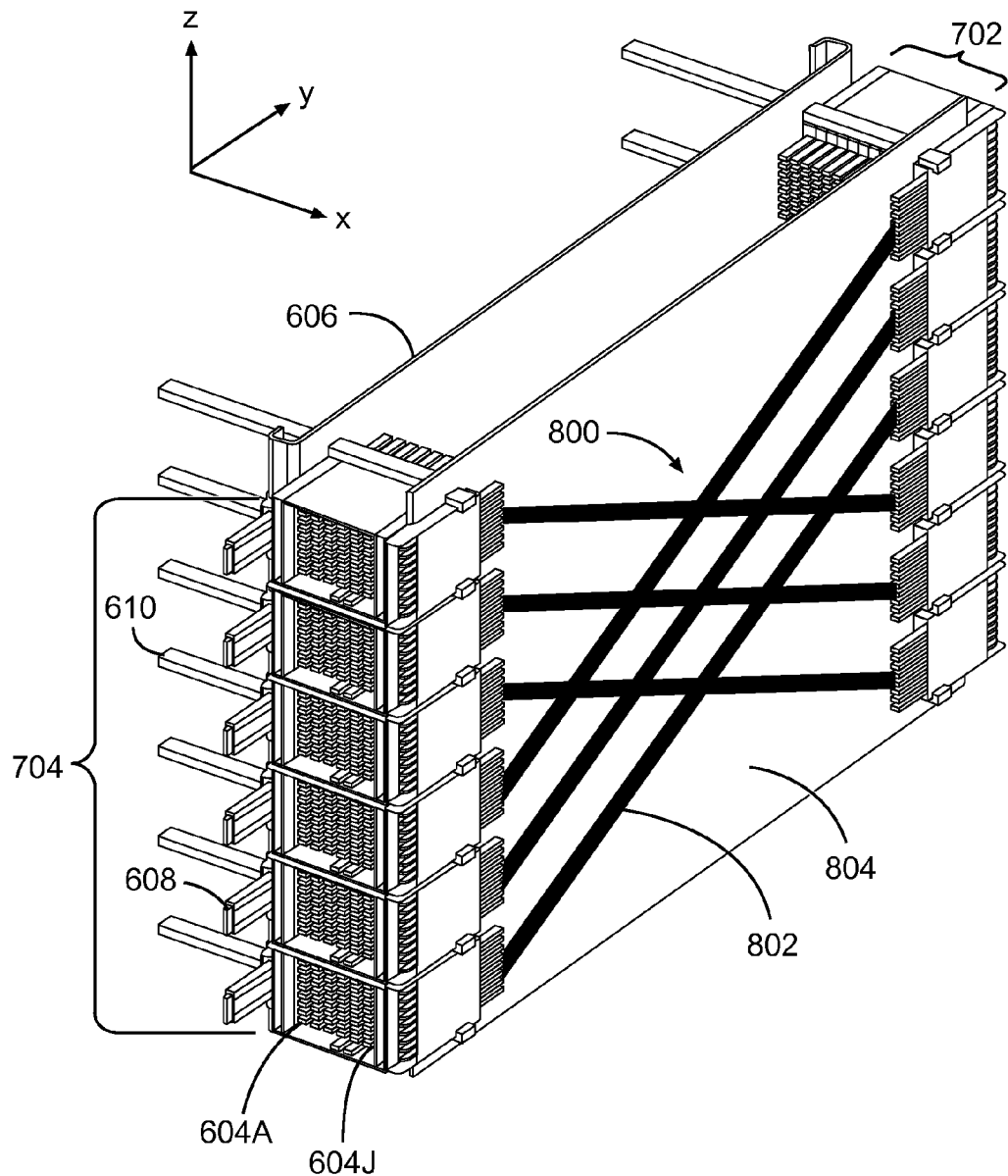
FIG. 8 illustrates a complete first wiring layer and a first portion of a second wiring layer in accordance with some embodiments described herein.

In FIG. 5, the example method 500 continues at operation 506 with providing an additional support plate, parallel along the first plane (e.g., the y-axis) to the support plate 606, to encase wiring sub-layers 600 between the additional support plate and the first support plate and to form a wiring layer at least somewhat similar to the structure shown in FIG. 8.

FIG. 8 illustrates a first wiring layer and a wiring sub-layer 800 with cable slices 802 of a second wiring layer in accordance with some embodiments described herein. Support plates 606 and 804 are oriented parallel to wiring sub-layers (not shown in FIG. 8). Support plates 606 and 804 act as mechanical support layers. By placing support plates 606 and 804 in the manner shown in FIG. 8, manufacturers can minimize the space used for mechanical support.

In some embodiments, support plates 606 and 804 have a series of openings in which to insert support elements, for example, support rods 610. These support rods 610 slide between connector slices 604A-604J of adjacent midplane connectors (not shown in FIG. 8). The support rods 610 can align connector slices 604A-604J and provide support for connector sets 702, 704 during line card insertion and de-insertion. The support rods 610, or another support element, can prevent movement of the two adjacent connectors in a direction, e.g., along the y-axis and z-axis, while the support plates 606 and 804 prevent movement of connectors in a different direction, e.g., along the x-axis.

The support rods 610 are extended to align wiring sub-layers and to align and join wiring layers as they are added. In some embodiments, support rods 610 are extended to engage the support plate 804 as additional wiring layers are added.

In some embodiments, the holes in the support plates 606 and 804 engage support tabs (not shown in FIG. 8, reference 905 in FIGS. 9 and 10) protruding from the walls of connector shrouds, instead of support rods. Support tabs can be used by providing a slot or a groove within the support plates 606 and 804. For example, the grooves in the support plates 606 and 804 can capture the support tabs on the connectors and disallow the connectors to move along the y-axis and z-axis.

In accordance with embodiments, cable slices 602 are snapped into connector shrouds on a wiring sub-layer 600 basis, and connector shrouds are supported by support plates at least somewhat similar to support plates 606 and 804. Different mechanisms can be used to fasten support plates 606 and 804 to each other or to other support plates. In some embodiments standoff mechanisms are used.

Figure 9:
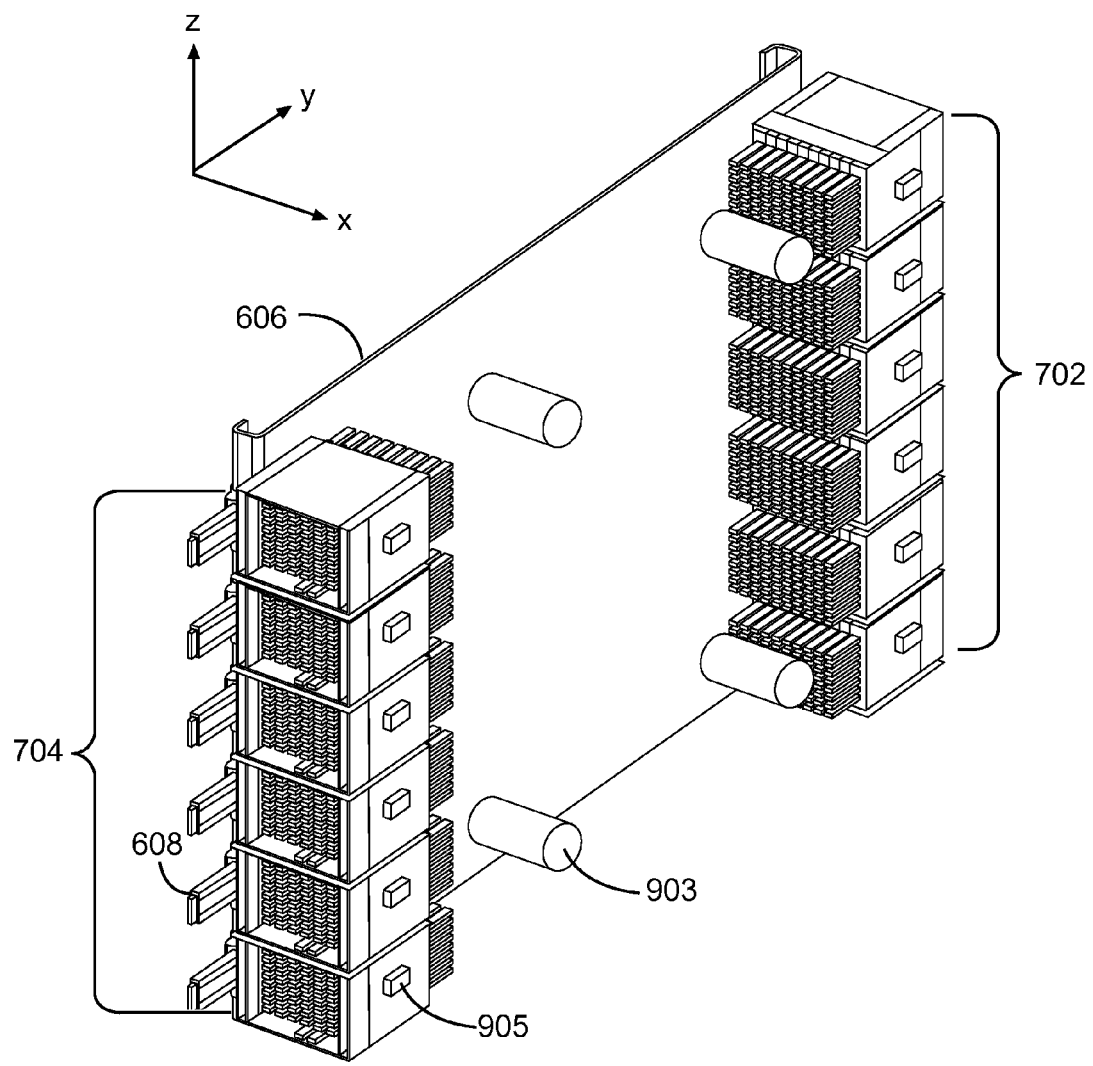
FIG. 9 illustrates standoffs and support tabs in accordance with some embodiments described herein.
Figure 10:
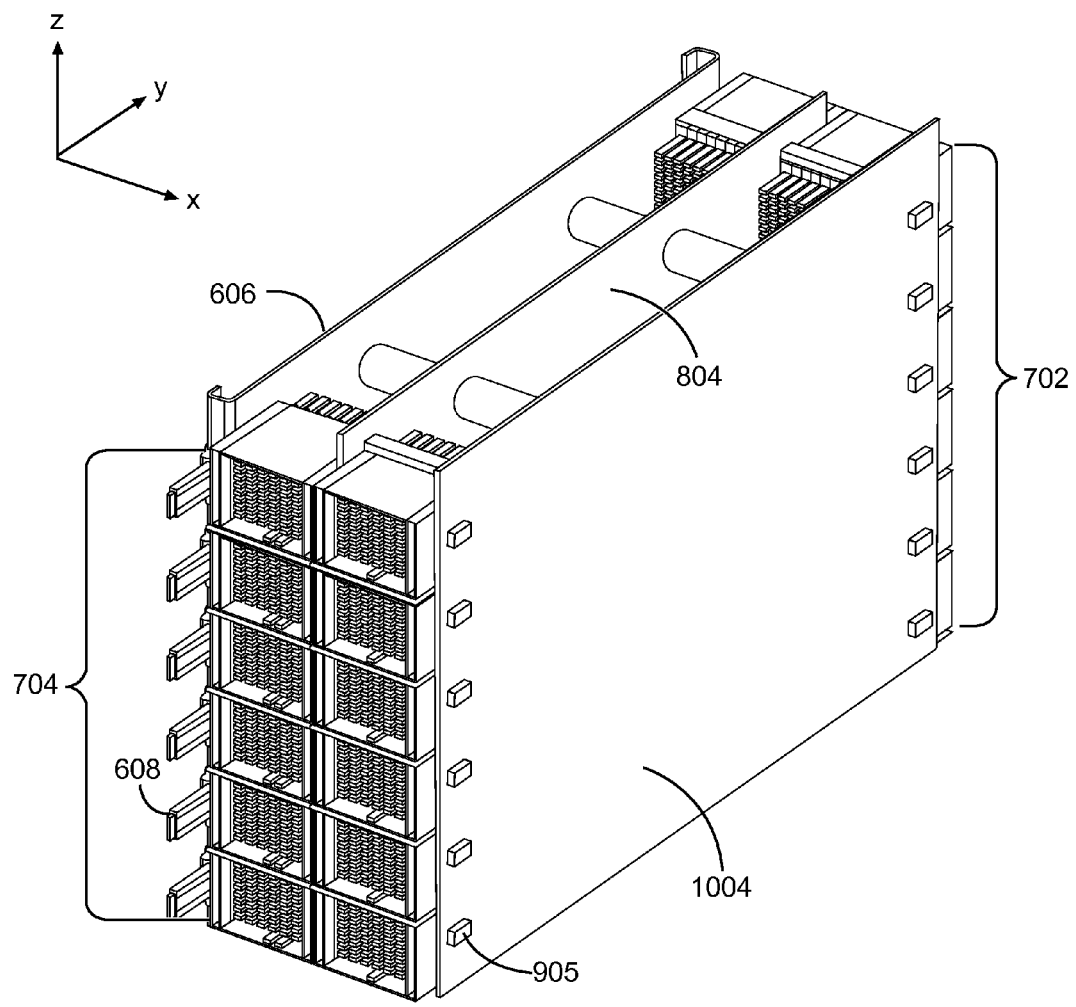
FIG. 10 illustrates standoffs between support plates of two wiring layers in accordance with some embodiments described herein.

For example FIG. 9 illustrates standoffs 903 and support tabs 905 in accordance with some embodiments described herein. FIG. 10 illustrates standoffs 903 between support plates 606, 804, and 1104 of two wiring layers in accordance with some embodiments described herein. FIG. 10 further illustrates support tabs 905 that have been added by providing a slot or a groove within the support plate 1004. There can also be slots or grooves within the other support plate 804 and within any other support plates in accordance with various embodiments. The grooves (not shown in FIG. 9 or 10) in the support plates 606, 804, 1004, etc., can capture support tabs 905 on the connectors of the connector sets 702, 704 to provide alignment and disallow the connectors to move along the y-axis and z-axis. Additionally, standoffs 903 are provided to fasten support plates 606 and 804 to each other, and to fasten support plates 804 and 1004 to each other.

Figure 11:
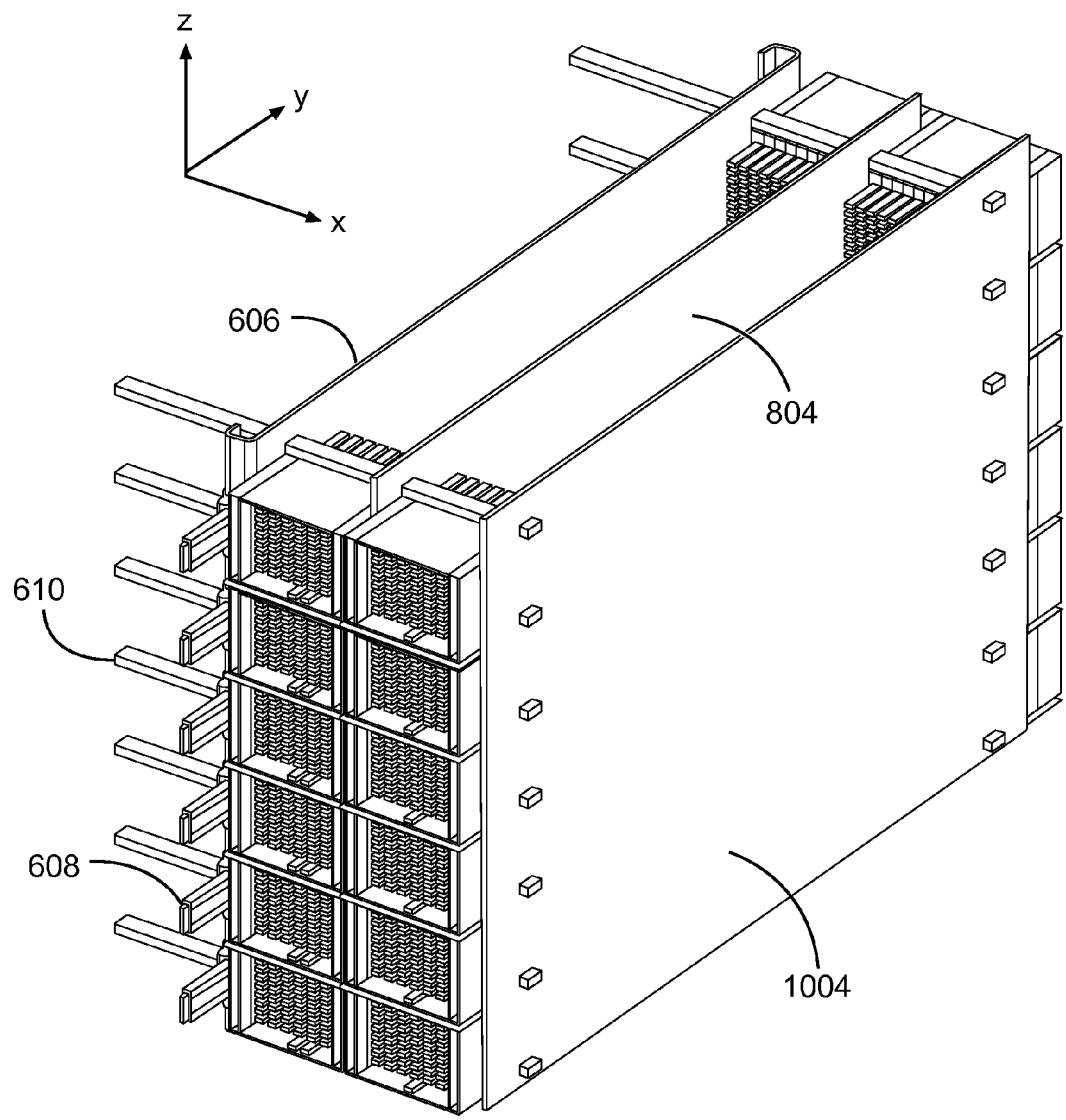
FIG. 11 illustrates inner and outer support plates for encasing two wiring layers in accordance with some embodiments described herein.

The method 500 can include adding several wiring layers through a process of adding support plates between wiring layers. FIG. 11 illustrates an inner support plate 804 and outer support plates 606 and 1004 for encasing two wiring layers in accordance with some embodiments. The method 500 can further include providing a power layer between at least any two wiring layers.

Figure 12:
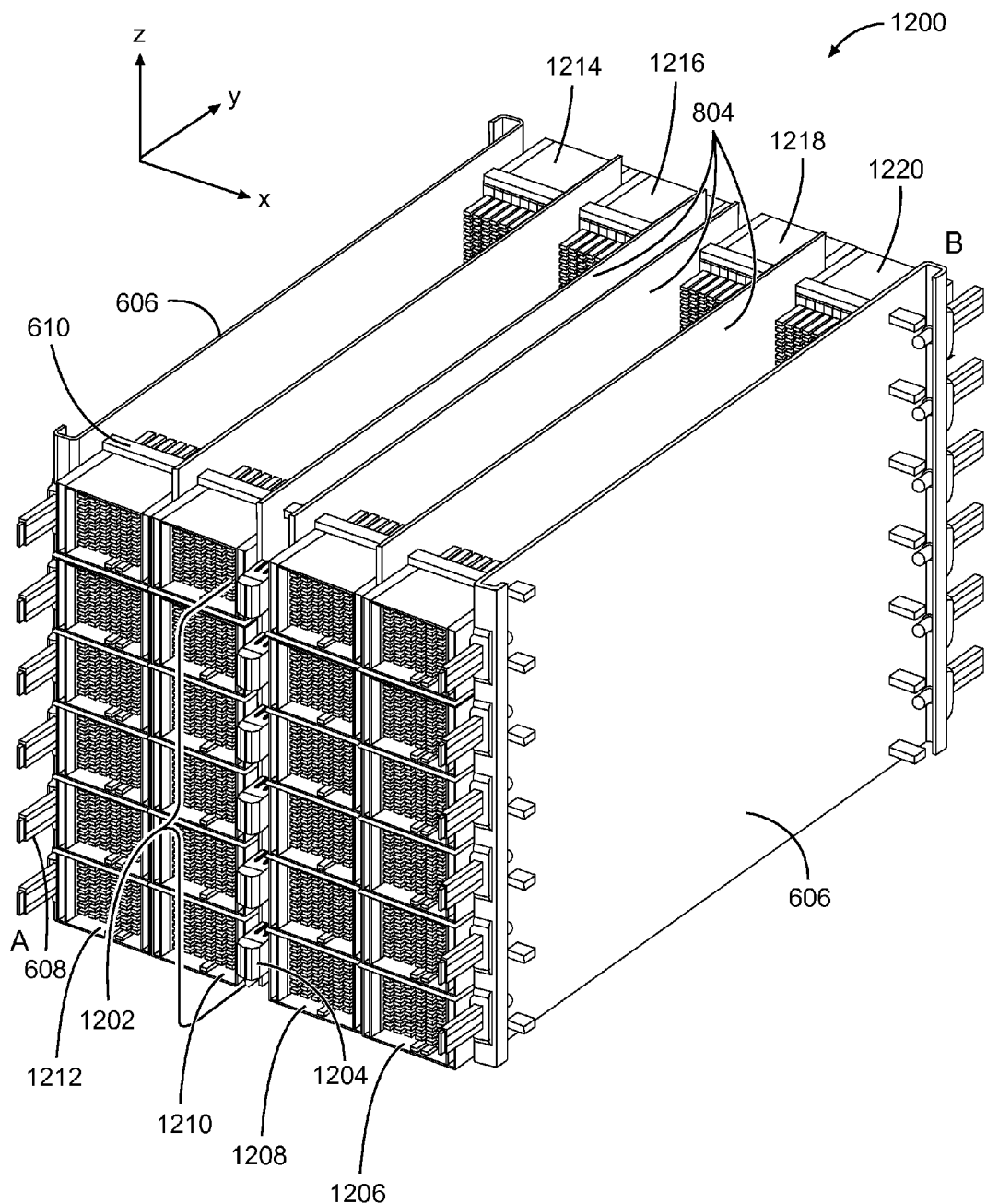
FIG. 12 illustrates a cabled midplane assembly with wiring layers and a power layer in accordance with some embodiments described herein.
Figure 13:
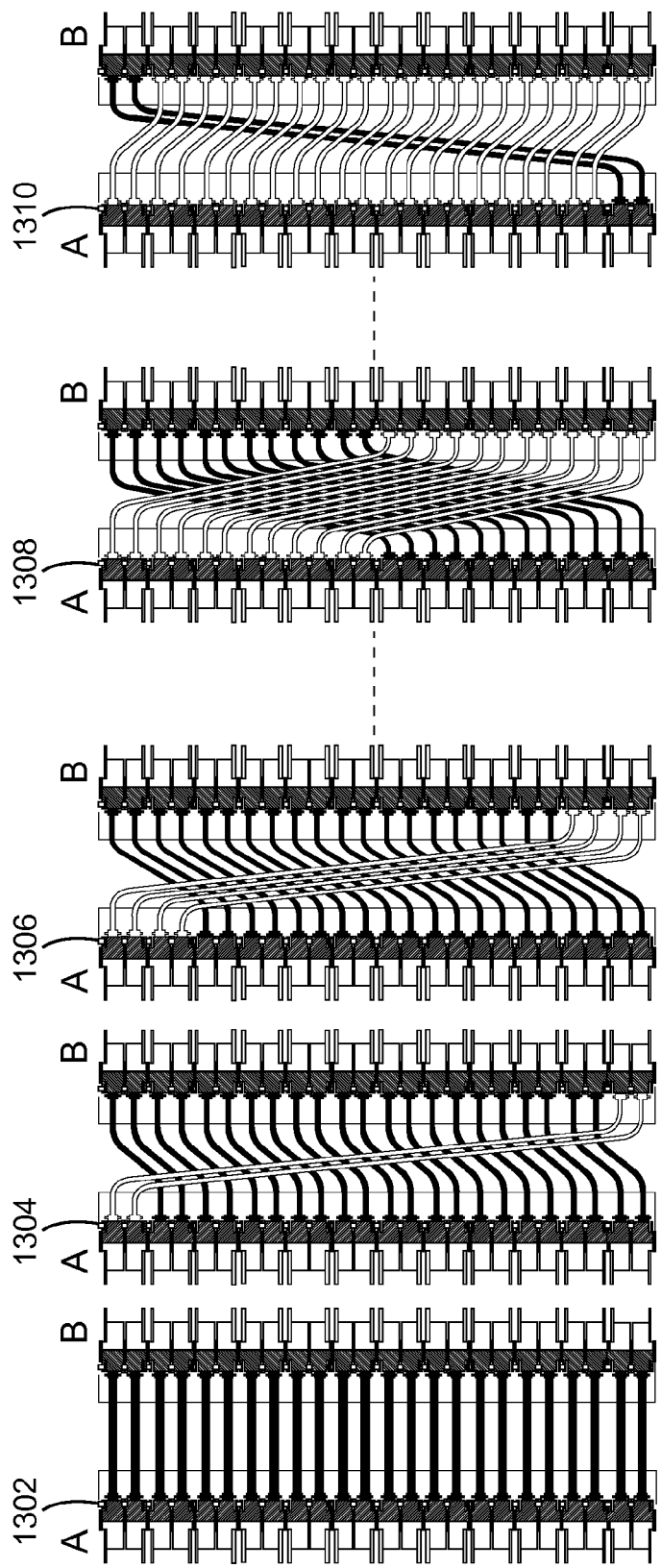
FIG. 13A illustrates a wiring diagram showing a first layer of individual, full swizzle connections of a cabled midplane in accordance with some embodiments described herein.
FIG. 13B illustrates a wiring diagram showing a second layer of individual, full swizzle connections of a cabled midplane in accordance with some embodiments described herein.
FIG. 13C illustrates a wiring diagram showing a third layer of individual, full swizzle connections of a cabled midplane in accordance with some embodiments described herein.
FIG. 13D illustrates a wiring diagram showing a fourth layer of individual, full swizzle connections of a cabled midplane in accordance with some embodiments described herein.
FIG. 13E illustrates a wiring diagram showing a fifth layer of individual, full swizzle connections of a cabled midplane in accordance with some embodiments described herein.

FIG. 12 illustrates a cabled midplane assembly 1200 with wiring layers and a power layer 1202 in accordance with some embodiments described herein. In the example of FIG. 12, the cabled midplane assembly 1200 includes four wiring layers (not shown in FIG. 12) between outer support plates 606 and inner support plates 804, and a power layer 1202 in accordance with some embodiments described herein. The power layer 1202 including power connections 1204 for providing power to line cards (not shown in FIG. 12) on the first side A of the cabled midplane assembly 1200 and to line cards on the second side B of the cabled midplane assembly 1200. In some embodiments, the power layer 1202 is not connected to wiring sub-layers. In some embodiments, the power layer 1202 includes or is coupled to distribution elements using, for example, discrete wiring or planar bus bar distribution, to bring power from a power supply bay (not shown) to the line cards 404, 406, 408, 410, 412, 414, 416, 418, 420, 422, 424 426 (FIG. 4).

FIG. 12 further depicts fully-engaged support rods 610. All support plates 606 and 804 are oriented parallel to each other and consume minimal space, which enables highest connector density. The support plates 606 and 804 enclose the wiring layers and support connectors 1206, 1208, 1210, 1212, 1214, 1216, 1218 and 1220 during line card insertion and removal.

Some or all of operations 502, 504 and 506 may be performed concurrently (e.g., simultaneously). Method 500 may include other operations besides operations 502, 504 and 506, such as attaching a device (e.g., cabled midplane assembly 1200) on a circuit board, forming connections, and other activities, so that the a midplane or backplane made by method 500 may include components similar to or identical to those described above with reference to FIG. 1 through FIG. 4.

An assembly methodology proposed herein addresses a need for a reliable, repeatable, cost effective way to manufacture a very large conductor count, all-to-all interconnected cabled backplanes and mid-planes. It also enables to achieve a very high density backplane style interconnect.

FIGS. 13A, 13B, 13C, 13D, and 13E illustrate layers of a full swizzle wiring diagram in accordance with some embodiments described herein. For example, the layers in each of FIGS. 13A, 13B, 13C, 13D, and 13E, taken together, illustrate a full wiring diagram of fabric ports through a midplane such as the midplanes described with reference to FIGS. 1-12. The illustrative example of FIGS. 13A, 13B, 13C, 13D, and 13E depict a 2-tier tree fabric topology, with tier 1 switch cards on one side A of the midplane and tier 2 switch cards on the other side B. For this topology, each sub-layer connects each connector on the tier 1 switch side A to one connector on the tier 2 switch side B. Each layer 1302, 1304, 1306, 1308 and 1310 has a different wiring diagram, complementary to the other wiring diagrams. Altogether, the full set of layers 1302, 1304, 1306, 1308 and 1310 form a full swizzle wiring, thus collectively achieve all (tier 1)-to-all (tier 2) fabric interconnect.

In addition to high speed fabric interconnect and power distribution layers, other layers can be added in various embodiments to address the need for low speed interconnect for management signals, among other possible uses and needs. The wiring and assembly methodology described above with respect to various embodiments is applicable to trees and other fabric topologies, as well as to backplane and midplane structures.

Figure 14:
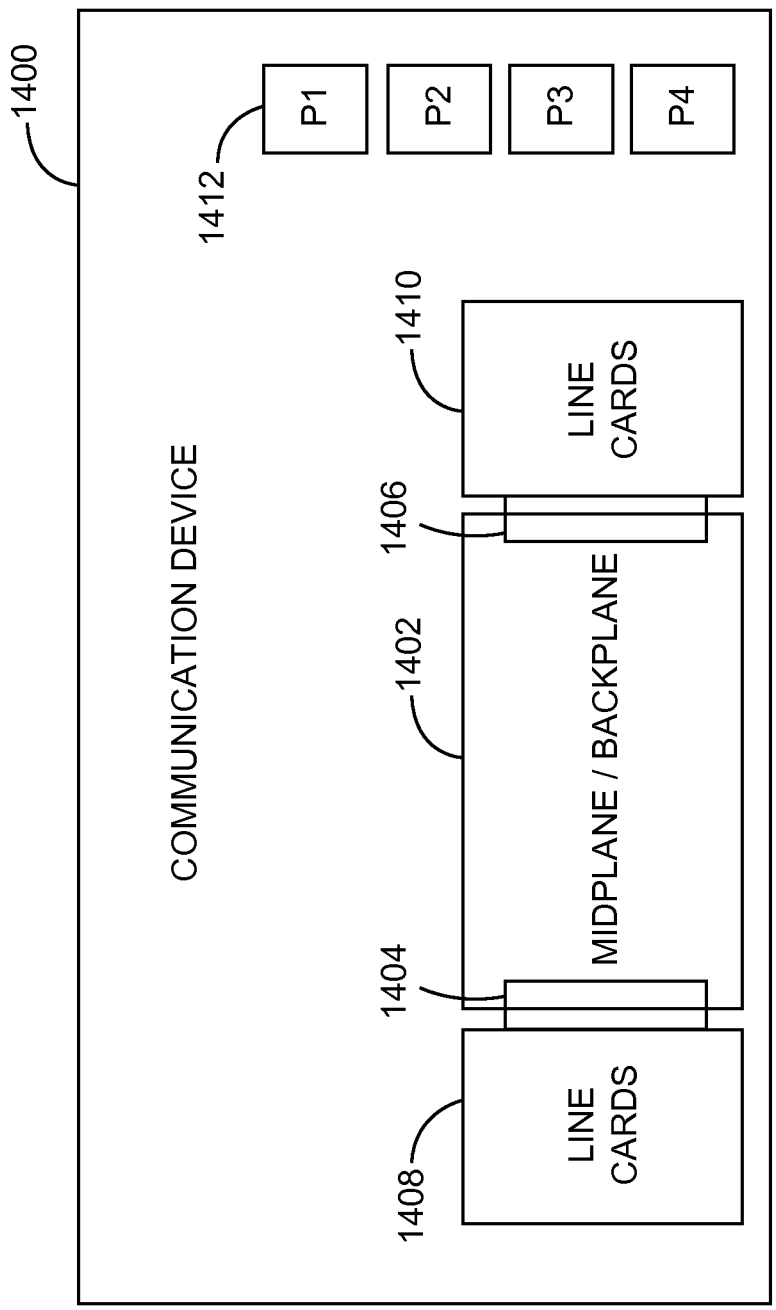
FIG. 14 illustrates a communication device in accordance with some embodiments described herein.

FIG. 14 illustrates a communication device 1400 in accordance with some embodiments described herein. The communication device 1400 can include a cabled midplane 1402. In some embodiments, the communication device 1400 can include a backplane. As described earlier herein with reference to FIGS. 6-7, the cabled midplane 1404 includes connector sets 1404 and 1406, on either side of the cabled midplane 1402. Each connector set 1404 and 1406 includes connectors to connect to respective line cards 1408 and 1410 on either side of the cabled midplane 1402. The communication device 1400 can serve as a switching system with at least one communication port 1412, or as any other device in a data center fabric, although embodiments are not limited thereto.

The illustrations of the apparatuses (e.g., wiring sub-layers 600, cable slices 602, communication devices 1400) and methods (e.g., method 500) described above are intended to provide a general understanding of the structure of different embodiments and are not intended to provide a complete description of all the elements and features of an apparatus that might make use of the structures described herein.

The apparatuses, devices, and methods described above may include or be included in high-speed computers, communication and signal processing circuitry, single or multi-processor modules, single or multiple embedded processors, multi-core processors, message information switches, and application-specific modules including multilayer, multi-chip modules. Such apparatuses may further be included as sub-components within a variety of other apparatuses (e.g., electronic systems), such as televisions, cellular telephones, personal computers (e.g., laptop computers, desktop computers, handheld computers, etc.), tablets (e.g., tablet computers), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

Additional Notes and Examples

Example 1 includes subject matter including a method of making an electronic apparatus (e.g., a cabled midplane, a cabled backplane, etc.), the method comprising providing a first support plate along a plane between a first connector set and a second connector set, the first connector set including a plurality of connectors to connect to respective line cards on a first side of the cabled midplane, the second connector set including a plurality of connectors to connect to respective line cards on a second side of the cabled midplane, connectors of the first connector set and the second connector set including a plurality of connector slices, the plurality of connector slices including at least a first connector slice that is a first distance along a first axis from the first support plate and a second connector slice that is a second distance, further than the first distance, along the first axis from the first support plate; and providing a first wiring sub-layer by mounting a first plurality of cable slices on the first support plate, each cable slice of the first plurality of cable slices to provide a connection between the first connector slice of a connector of the first connector set to the first connector slice of a connector of the second connector set, such that the first wiring sub-layer connects each connector of the first connector set, through one cable slice, to a connector of the second connector set.

In Example 2, the subject matter of Example 1 may optionally include providing at least a second wiring sub-layer by connecting a second plurality of cable slices, each cable slice of the second plurality of cable slices to provide a connection between the second connector slice of a connector of the first connector set to the second connector slice of a connector of the second connector set, such that the second wiring sub-layer connects each connector of the first connector set, through one cable slice, to a connector of the second connector set; and providing a second support plate, parallel to the first support plate and parallel to the first wiring sub-layer and the second wiring sub-layer, to encase the first wiring sub-layer and the second wiring sub-layer between the second support plate and the first support plate and to form a first wiring layer.

In Example 3, the subject matter of Example 2 may optionally include wherein providing the second wiring sub-layer includes connecting the second plurality of cable slices such that a connector of the first connector set is connected to a different connector of the second connector set in the second wiring sub-layer than the respective connector of the first connector set is connected to in the first wiring sub-layer.

In Example 4, the subject matter of any of Examples 1-3 may optionally include providing a plurality of wiring sub-layers such that each connection in each connector in the first connector set is connected, through a separate connector slice, to each connection in each connector in the second connector set.

In Example 5, the subject matter of any of Examples 1-4 may optionally include testing electrical connectivity within the first wiring sub-layer, prior to providing the second wiring sub-layer.

In Example 6, the subject matter of any of Examples 1-2 may optionally include providing at least one opening in the first support plate between any two adjacent connectors of each of the first connector set and the second connector set; and preventing movement of the two adjacent connectors in a direction along a second axis different from the first axis by inserting a support element in the at least one opening.

In Example 7, the subject matter of Example 6 may optionally include wherein the support element includes a tab 1003 (FIG. 10) on at least one connector and a groove on at least the first support plate within which the tab is captured to prevent movement of the at least one connector.

In Example 8, the subject matter of Example 6 may optionally include wherein the support element includes a support rod.

In Example 9, the subject matter of Example 8 may optionally include providing a second wiring layer including at least a first wiring sub-layer mounted to a second side of the second support plate separated from the second wiring sub-layer of the first wiring layer, and further providing a third support plate to encase the first wiring sub-layer of the second wiring layer between the second support plate and the third support plate; and extending the support rod by a connector width of a third connector mounted to the second support plate, to join the first wiring layer and the second wiring layer.

In Example 10, the subject matter of Example 9 may optionally include providing a power layer between the second wiring layer and the first wiring layer, the power layer including power connections for providing power to line cards on the first side of the cabled midplane and to line cards on the second side of the cabled midplane.

In Example 11, the subject matter of any of Examples 1-10 may optionally include wherein mounting the first plurality of cable slices includes mounting a plurality of conductors such that a conductor crosses over other conductors of the plurality of conductors at no more than one point in the plane between the first connector set and the second connector set.

In Example 12, the subject matter of any of Examples 1-11 may optionally include wherein mounting the first plurality of cable slices further includes connecting the plurality of conductors such that any point on the plane between the first connector set and the second connector set includes no more than one instance of a conductor crossover between conductors of the plurality of conductors.

In Example 13, the subject matter of any of Examples 1-12 may optionally include wherein providing the first support plate includes providing guide pins to displace the first support plate from the first wiring sub-layer by a distance along the first axis.

Example 14 includes subject matter (such as a cabled midplane, a cabled backplane, etc., or electronic system apparatus, or machine) including a first support plate along a plane between a first connector set and a second connector set, the first connector set including a plurality of connectors to connect to respective line cards on a first side of the cabled midplane, the second connector set including a plurality of connectors to connect to respective line cards on a second side of the cabled midplane, connectors of the first connector set and the second connector set including a plurality of connector slices, the plurality of connector slices including at least a first connector slice that is a first distance along a first axis from the first support plate and a second connector slice that is a second distance, further than the first distance, along the first axis from the first support plate; and a first wiring sub-layer including a first plurality of cable slices mounted on the first support plate, each cable slice of the first plurality of cable slices to provide a connection between the first connector slice of a connector of the first connector set to the first connector slice of a connector of the second connector set, such that the first wiring sub-layer connects each connector of the first connector set, through one cable slice, to a connector of the second connector set.

In Example 15, the subject matter of Example 14 may optionally include at least a second wiring sub-layer including a second plurality of cable slices, each cable slice of the second plurality of cable slices to provide a connection between the second connector slice of a connector of the first connector set to the second connector slice of a connector of the second connector set, such that the second wiring sub-layer connects each connector of the first connector set, through one cable slice, to a connector of the second connector set; and a second support plate, parallel to the first support plate, to encase the first wiring sub-layer and the second wiring sub-layer between the second support plate and the first support plate and to form a first wiring layer of the cabled midplane.

In Example 16, the subject matter of any of Examples 14-15 can optionally include a power layer.

In Example 17, the subject matter of Example 16 can optionally include, wherein the power layer is not connected to conductors of either the first wiring sub-layer or the second wiring sub-layer.

In Example 18, the subject matter of Example 15 can optionally include wherein a connector of the first connector set is connected to a different connector of the second connector set in the second wiring sub-layer than the respective connector of the first connector set is connected to in the first wiring sub-layer.

In Example 19, the subject matter of any of Examples 14-18 can optionally include wherein each cable slice includes a plurality of conductors, and wherein, cable slices are mounted such that a conductor crosses over other conductors of the plurality of conductors at no more than one point in the plane between the first connector set and the second connector set.

Example 20 includes subject matter (such as a device, a communication device, electronic system, or machine) including a cabled midplane (or backplane, etc.) including a first connector set and a second connector set, the first connector set including a plurality of connectors to connect to respective line cards on a first side of the cabled midplane, the second connector set including a plurality of connectors to connect to respective line cards on a second side of the cabled midplane, connectors of the first connector set and the second connector set including a plurality of connector slices; a first support plate positioned along a plane between the first connector set and the second connector set, wherein the plurality of connector slices include at least a first connector slice that is a first distance along a first axis from the first support plate and a second connector slice that is a second distance, further than the first distance, along the first axis from the first support plate; and a first wiring sub-layer including a first plurality of cable slices mounted on the first support plate, each cable slice of the first plurality of cable slices to provide a connection between the first connector slice of a connector of the first connector set to the first connector slice of a connector of the second connector set, such that the first wiring sub-layer connects each connector of the first connector set, through one cable slice, to a connector of the second connector set; a first line card coupled to a connector on the first side of the cabled midplane; and a second line card coupled to a connector on the second side of the cabled midplane.

In Example 21, the subject matter of Example 20 may optionally include, wherein the communication device includes a switching system with at least one communication port.

The above description and the drawings illustrate some embodiments to enable those skilled in the art to practice embodiments. Other embodiments may incorporate structural, logical, electrical, process, and other changes. Examples merely typify possible variations. Portions and features of some embodiments may be included in, or substituted for, those of other embodiments. Many other embodiments will be apparent to those of skill in the art upon reading and understanding the above description. Therefore, the scope of various embodiments is determined by the appended claims, along with the full range of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A cabled midplane comprising:
a first support plate along a plane between a first connector set and a second connector set, the first connector set including a plurality of connectors to connect to respective line cards on a first side of the cabled midplane, the second connector set including a plurality of connectors to connect to respective line cards on a second side of the cabled midplane, connectors of the first connector set and the second connector set including a plurality of connector slices, the plurality of connector slices including at least a first connector slice that is a first distance along a first axis from the first support plate and a second connector slice that is a second distance, further than the first distance, along the first axis from the first support plate;
a first wiring sub-layer including a first plurality of cable slices mounted on the first support plate, each cable slice of the first plurality of cable slices to provide a connection between the first connector slice of a connector of the first connector set to the first connector slice of a connector of the second connector set, such that the first wiring sub-layer connects each connector of the first connector set, through one cable slice, to a connector of the second connector set;
at least a second wiring sub-layer including a second plurality of cable slices, each cable slice of the second plurality of cable slices to provide a connection between the second connector slice of a connector of the first connector set to the second connector slice of a connector of the second connector set, such that the second wiring sub-layer connects each connector of the first connector set, through one cable slice, to a connector of the second connector set; and
a second support plate, parallel to the first support plate, to encase the first wiring sub-layer and the second wiring sub-layer between the second support plate and the first support plate and to form a first wiring layer of the cabled midplane.

2. The cabled midplane of claim 1, further including a power layer.

3. The cabled midplane of claim 2, wherein the power layer is not connected to conductors of either the first wiring sub-layer or the second wiring sub-layer.

4. The cabled midplane of claim 1, wherein a connector of the first connector set is connected to a different connector of the second connector set in the second wiring sub-layer than the respective connector of the first connector set is connected to in the first wiring sub-layer.

5. The cabled midplane of claim 1, wherein each cable slice includes a plurality of conductors, and wherein, cable slices are mounted such that a conductor crosses over other conductors of the plurality of conductors at no more than one point in the plane between the first connector set and the second connector set.

6. A communication device including:
a cabled midplane including
a first connector set and a second connector set, the first connector set including a plurality of connectors to connect to respective line cards on a first side of the cabled midplane, the second connector set including a plurality of connectors to connect to respective line cards on a second side of the cabled midplane, connectors of the first connector set and the second connector set including a plurality of connector slices;
a first support plate positioned along a plane between the first connector set and the second connector set, wherein the plurality of connector slices include at least a first connector slice that is a first distance along a first axis from the first support plate and a second connector slice that is a second distance, further than the first distance, along the first axis from the first support plate;
a first wiring sub-layer including a first plurality of cable slices mounted on the first support plate, each cable slice of the first plurality of cable slices to provide a connection between the first connector slice of a connector of the first connector set to the first connector slice of a connector of the second connector set, such that the first wiring sub-layer connects each connector of the first connector set, through one cable slice, to a connector of the second connector set;
at least a second wiring sub-layer including a second plurality of cable slices, each cable slice of the second plurality of cable slices to provide a connection between the second connector slice of a connector of the first connector set to the second connector slice of a connector of the second connector set, such that the second wiring sub-layer connects each connector of the first connector set, through one cable slice, to a connector of the second connector set; and
a second support plate, parallel to the first support plate, to encase the first wiring sub-layer and the second wiring sub-layer between the second support plate and the first support plate and to form a first wiring layer of the cabled midplane;
a first line card coupled to a connector on the first side of the cabled midplane; and
a second line card coupled to a connector on the second side of the cabled midplane.

7. The communication device of claim 6, wherein the communication device includes a switching system with at least one communication port.

* * * * *